United States Patent
Alinat et al.

(10) Patent No.: US 7,355,925 B2
(45) Date of Patent: Apr. 8, 2008

(54) SIGNAL-PROCESSING METHOD AND ACTIVE SONAR IMPLEMENTING SAME

(75) Inventors: Pierre Alinat, Vence (FR); Georges Bienvenu, Biot (FR)

(73) Assignee: Thales (FR)

( * ) Notice: Subject to any disclaimer, the term of this patent is extended or adjusted under 35 U.S.C. 154(b) by 187 days.

(21) Appl. No.: 10/551,673

(22) PCT Filed: Mar. 24, 2004

(86) PCT No.: PCT/EP2004/050354

§ 371 (c)(1),
(2), (4) Date: Sep. 30, 2005

(87) PCT Pub. No.: WO2004/088355

PCT Pub. Date: Oct. 14, 2004

(65) Prior Publication Data

US 2006/0193206 A1  Aug. 31, 2006

(30) Foreign Application Priority Data

Apr. 1, 2003 (FR) ................... 03 04042

(51) Int. Cl.
| G01S 15/10 | (2006.01) |
| G01S 15/52 | (2006.01) |
| G01S 15/58 | (2006.01) |
| G01S 15/89 | (2006.01) |

(52) U.S. Cl. .................................... 367/100
(58) Field of Classification Search ................ 367/100
See application file for complete search history.

(56) References Cited

U.S. PATENT DOCUMENTS

| 2,431,854 A | 12/1947 | Wood |
| 4,562,438 A | 12/1985 | Wilkinson et al. |
| 5,212,490 A | 5/1993 | Nelson et al. |
| 6,304,513 B1 * | 10/2001 | Billon ..................... 367/88 |
| 2006/0193206 A1 * | 8/2006 | Alinat et al. ............ 367/88 |

FOREIGN PATENT DOCUMENTS

| EP | 0 898 176 A | 2/1999 |
| FR | 2 769 372 A | 4/1999 |
| WO | WO 2004088355 A1 * | 10/2004 |

OTHER PUBLICATIONS

Carmillet V et al : "Low-speed targets sonar detection using autoregressive models in reverberation; experimental performances for wideband signals". Sep. 28, 1998.
Carmillet Valerie: "Contribution a la detection en presence de reverberation. Applications en acoustique sous-marine" 1998, Grenoble, XP002265034.

* cited by examiner

Primary Examiner—Dan Pihulic
(74) Attorney, Agent, or Firm—Lowe Hauptman Ham & Berner, LLP

(57) ABSTRACT

The invention relates to the field of underwater acoustics and more particularly to the field of signal processing in a low frequency (LF) active sonar system.

The present invention makes it possible to decrease the false alarm rate while retaining the classification of the objects.

The subject of the invention is a method of processing signals received corresponding to a signal emitted comprising by recurrence two pulses, a first Doppler tolerant broadband pulse of HFM type in particular and a second Doppler intolerant broadband pulse of BPSK type in particular, comprising:
- a step of detecting objects performed on the part of the signal received corresponding to the first pulses and providing an alarm for each object detected, and
- a step of classifying the objects detected performed on the part of the signal received corresponding to the second pulses for the alarms satisfying at least one predetermined criterion.

13 Claims, 2 Drawing Sheets

SIGNAL-PROCESSING METHOD AND ACTIVE SONAR IMPLEMENTING SAME

FIELD OF THE INVENTION

The invention relates to the field of underwater acoustics and more particularly to the field of signal processing in a low frequency (LF) active sonar system.

BACKGROUND OF THE INVENTION

This type of system is generally towed from a surface vessel and comprises a fish equipped with an LF emitter which tows a linear receiving antenna furnished with acoustic or hydrophonic sensors. Such a fish and such an emitter are for example described respectively in French Patents published under numbers 2735645 and 2776161. However, the invention may be applied to all types of active sonars. It is well known that an active sonar emits recurrent acoustic pulses and that the echoes received in return are processed to detect and classify any targets.

When an active sonar operates in a zone such that the bottom is insonified, the reverberation which originates from the bottom in essence greatly limits the operational usefulness of the sonar on account of the overly large number of false alarms which appear. This is particularly true for shallow depths.

To reduce nuisance in a reverberating medium, it is known to use emission codes that harness the wide frequency bands, typically an octave, of present-day transducers. These codes possess good distance resolution, hence the large number of alarms that are produced.

It is known to emit at each recurrence, either an HFM (Hyperbolic Frequency Modulation) code, or a BPSK (Binary Pulse Shift Keying) code or an FP (Frequency Pulse) code.

The HFM code is Doppler tolerant: it therefore does not allow measurement of the Doppler induced by a target in motion but, on the other hand, the matched filtering on reception requires only a single copy.

The BPSK code is Doppler intolerant and is used to measure the Doppler; it allows the same detection performance as the HFM code but the matched filtering on reception requires a significant number of copies to carry out the matched filtering on reception, typically a number greater than 200, and hence a correspondingly large processing cost.

OBJECT OF THE INVENTION

As for the FP code, it is used to measure the inherent Doppler of the emitter.

SUMMARY OF THE INVENTION

The present invention makes it possible to decrease the false alarm rate while retaining the classification of the objects.

The object of the invention is therefore a method of processing signals received corresponding to a signal emitted comprising by recurrence two pulses, a first Doppler tolerant broadband pulse and a second Doppler intolerant broadband pulse, comprising:

a step of detecting objects performed on the part of the signal received corresponding to the first pulses and providing an alarm for each object detected, and a step of classifying the objects detected performed on the part of the signal received corresponding to the second pulses for the alarms satisfying at least one predetermined criterion.

At each recurrence, the two HFM and BPSK codes are emitted. The detection of the alarms is done with the HFM code and the estimation of the Doppler is done with the BPSK code on the alarms which exceed a certain threshold, so as to eliminate the bottom echoes. Stated otherwise:

detection with the HFM code

Doppler classification with the BPSK code.

Moreover, the bottom echoes being identified, the measurement of the inherent Doppler of the emitter is done by analyzing the bottom echoes produced by the BPSK code.

DESCRIPTION OF THE FIGURES

The characteristics and advantages of the invention will become more clearly apparent on reading the description, offered by way of example, and the figures pertaining thereto which represent.

DETAILED DESCRIPTION

Figure 1:
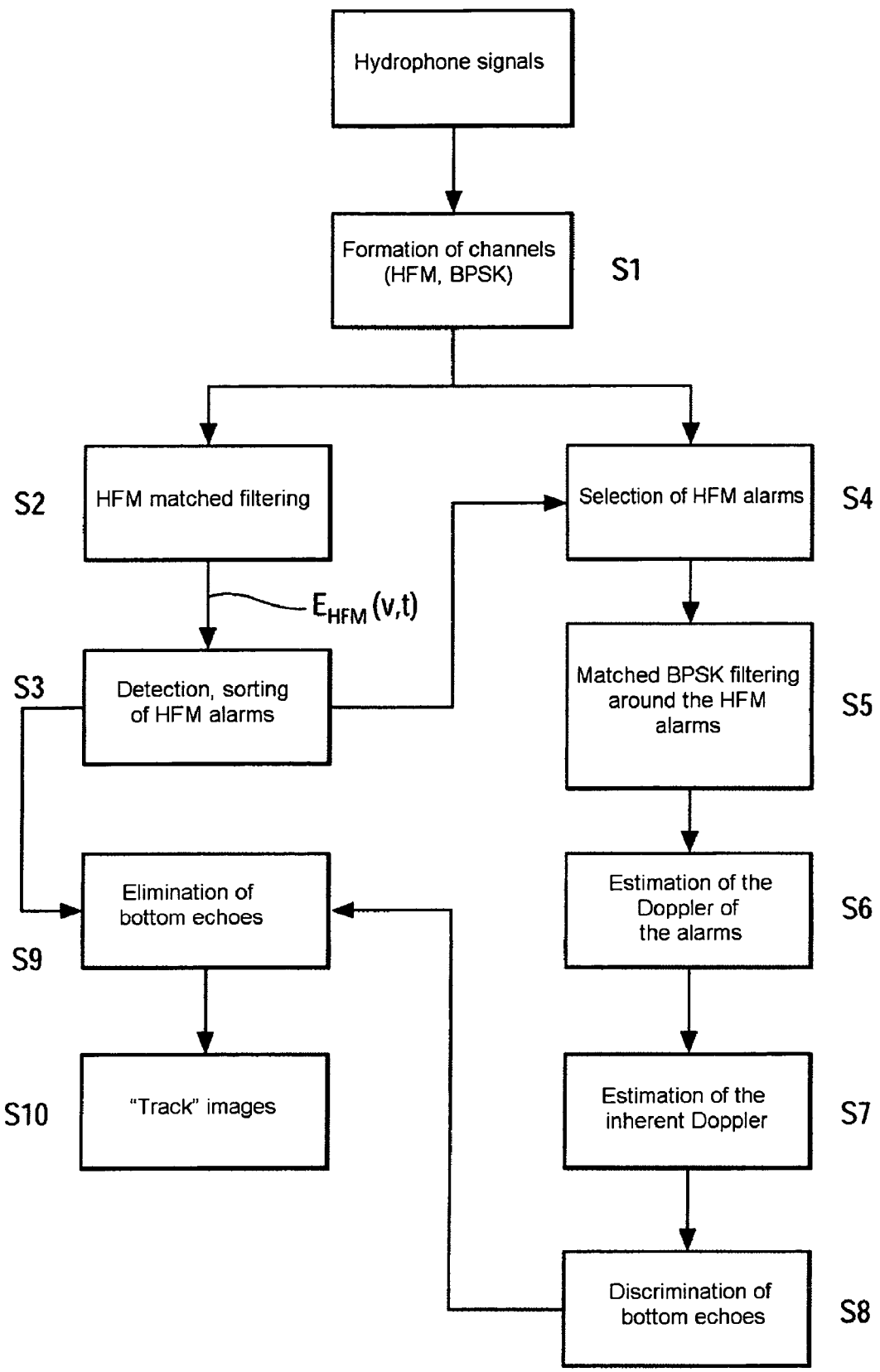
FIG. 1, the successive steps of the method according to the invention.

FIG. 1 represents the successive steps of the method according to the invention.

In a known manner, the hydrophone signals undergo upstream processing (demodulation, filtering, amplification, etc.) and are then digitized. In the case of an active sonar, these signals contain the signals emitted after propagation through the water via the direct path and the reflected paths to which are added the reverberated signals. In particular, among the signals reflected, the echoes originating from the sea bottom constitute a significant source of false alarms, in particular at shallow depths.

According to the invention, at each recurrence are emitted two coded pulses, HFM and BPSK, whose characteristics make it possible to separate them on reception. They can be emitted at different instants with totally or partly overlapping frequency bands, or else be emitted simultaneously in distinct frequency bands, or both at once.

Referring to FIG. 1, the processing of the hydrophone signals consists firstly in forming channels S1 in a known manner, this processing being independent of the code emitted.

To the signals of HFM channels is applied the matched filtering processing S2 consisting in correlating the signal received with a copy of the signal emitted which after rms detection provides signals representative of the energy as a function of channel (v) and of time (t) i.e. $E_{HFM}(v,t)$.

The next step S3 consists in detecting and in sorting the alarms with regard to an energy criterion. In a conventional manner, the local maxima are firstly searched for by comparison with a predetermined threshold. Thereafter, a normalization is performed by calculating for each local maximum a value equal to $(E_{HFM}-M)/\sigma$ where M is the mean of the reference noise, taken in the neighborhood of the "channels/time" space (v,t) and $\sigma$ the corresponding standard deviation. Then, any maxima around each maximum are eliminated if they have lower normed energy. Finally, the actual detection is obtained by comparing the noneliminated maxima with a normed energy threshold.

According to the invention, the matched filtering processing S5 on the "BPSK" channel signals is performed only on the alarms arising from the processing of the HFM pulses S4. The matched filtering processing corresponding to the BPSK code which is Doppler tolerant requires that the channel signal be correlated with several Dopplerized copies covering a range of given target velocities. Thus for an alarm are obtained as many signals as there are copies and form the Doppler channels.

The next step S6 consists in estimating the Doppler d and the associated standard deviation $\sigma_{d_i}$ of the alarm "i" on the basis of the signals arising from the Doppler channels. If $d_{channel}$ is the Doppler given by the channel in which the alarm is to be found, the Doppler d is obtained by interpolation with the Dopplers of the adjacent channels.

The next step S7 consists in estimating the inherent Doppler $d_p$ due to the velocity of the antennas, emission and reception, with respect to the bottom. It is estimated at each instant, either on the basis of a Doppler of the echoes originating from the bottom and detected by the BPSK code, or on the basis of the reverberation spectrum obtained by an FP code emitted with the HFM and BPSK codes. The standard deviation $\sigma_d$ is also estimated.

The next step S8 consists in deciding whether this alarm corresponds to a bottom echo or indeed to a true echo at non zero radial velocity. The values of the Doppler di and of the inherent Doppler dp and also the corresponding rms deviations $\sigma_{d_i}$ and $\sigma_{d_p}$ are available.

Figure 2:
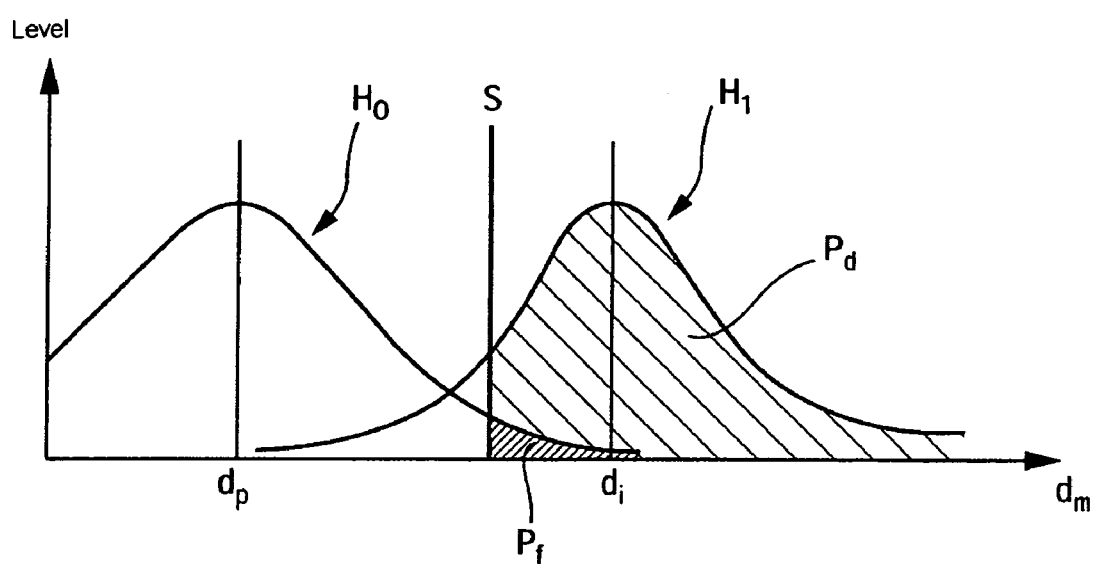
FIG. 2, the probability distributions of the measured Doppler $d_m$ for two hypotheses: $H_0$ for (stationary) bottom echo and $H_1$ for assumed true Doppler echo $d_i$.

Represented in FIG. 2 are the probability distributions of the measured Doppler $d_m$ for two hypotheses: $H_0$ for (stationary) bottom echo and $H_1$ for assumed true Doppler echo $d_i$. $H_0$ is centered on $d_p$ with a rms deviation $(\sigma_{d_p}^2 + \sigma_{d_p}^2)^{1/2}$ and $H_1$ is centered on $d_i$ with a rms deviation $\sigma_{d_i}$.

To decide, $d_i - d_p$ is calculated and a threshold S is chosen: if $d_i - d_p > S$, there is a true echo. The value of S is obtained on the basis of the values of $P_f$ which is the probability of deciding wrongly that a bottom echo is true.

The process of discrimination between true echo with non zero radial velocity and bottom echo for each alarm detected by HFM is repeated. Next, among the HFM alarms detected and sorted, one undertakes the elimination S9 of the alarms which correspond to the bottom echoes (or to true echoes with zero radial velocity).

In step S10 is obtained an image of the tracks (series of alarms as a function of time and direction) which is ridded of the false alarms and in particular the bottom echoes, all the better when they are strong and hence a nuisance.

The invention claimed is:

1. A method of processing signals received corresponding to an emitted signal, the emitted signal comprising by recurrence two pulses, a first Doppler tolerant broadband pulse and a second Doppler intolerant broadband pulse, said method comprising:
    detecting objects performed on the part of the signal received corresponding to the first Doppler tolerant broadband pulse transmitted at each recurrence and providing an alarm for each object detected;
    applying a matched filtering to the signal received corresponding to the second Doppler intolerant broadband pulse transmitted for each recurrence, said filtering making, for each detected object having satisfied at least a predetermined criterion of selection, correlations between said signal and several dopplerized copies of said transmitted second pulse, said correlations producing several signals corresponding to several Doppler channels; and
    performing a Doppler classification of the detected objects;
    wherein said Doppler classification is performed by comparing with a threshold the Doppler of every detected object having satisfied at least a predetermined criterion of selection, this Doppler being determined from the signals resulting from the application of the matched filtering.

2. The method of processing signals as claimed in claim 1, wherein the predetermined criterion applied to every detected object is based on a comparison of its energy with a predetermined threshold.

3. The method of processing signals as claimed in claim 2, further comprising a step of applying a first matched filtering to part of the signal received corresponding to the Doppler tolerant pulses said applying step taking place before the detection of objects and providing a signal corresponding to an energy $E_{HFM}(v,t)$.

4. The method of processing signals as claimed in claim 3, wherein said first matched filtering comprises:
    correlating the part of the signal received corresponding to a Doppler tolerant pulse with a copy of the said Doppler tolerant pulse,
    applying rms detection to the correlated signal and providing signals representing the energy as a function of channel and time $E_{HFM}(v,t)$.

5. The method of processing signals as claimed in claim 1, wherein the step of detecting objects comprises:
    searching for the local energy maxima $E_{HFM}(v,t)$ by comparison with a predetermined energy threshold $E_s$,
    normalizing the maxima obtained by calculation for each local maxima of the value $(E_{HFM} - M)/\sigma$, M being the mean of the reference noise and $\sigma$ the corresponding standard deviation,
    eliminating the maxima of lower normed energy,
    selecting the alarms corresponding to non-eliminated normed maxima that are greater than a predetermined threshold of normed energy $E_{SN}$.

6. The method of processing signals as claimed in claim 4, wherein said step of detecting objects comprises:
    searching for the local energy maxima $E_{HFM}(v,t)$ by comparison with a predetermined energy threshold $E_s$,
    normalizing the maxima obtained by calculation for each local maxima of the value $(E_{HFM} - M)/\sigma$, M being the mean of the reference noise and $\sigma$ the corresponding standard deviation,
    eliminating the maxima of lower normed energy,
    selecting the alarms corresponding to non-eliminated normed maxima that are greater than a predetermined threshold of normed energy $E_{SN}$.

7. The method of processing signals as claimed in claim 1, further comprising a step of estimating Doppler $d_i$ of the detected objects satisfying at least one predetermined criterion, and/or its associated standard deviations $\sigma_{d_i}$, said estimation being made on the basis of the signals arising from the Doppler channels.

8. The method of processing signals as claimed in claim 7, wherein the inherent Doppler is estimated at each instant:
    either on the basis of a Doppler of the part of the signal received corresponding to the reverberation of the Doppler intolerant pulses,
    or, on the basis of a reverberation spectrum obtained by an emitted frequency pulse (FP) code.

9. A method of processing signals received corresponding to a signal emitted comprising by recurrence two pulses, a first Doppler tolerant broadband pulse and a second Doppler intolerant broadband pulse, said method comprising forming a first channel comprising the part of the signal received corresponding to the Doppler tolerant pulses, and a second channel comprising part of the signal received corresponding to the Doppler intolerant pulses, applying a first matched filtering to the signal on the first channel followed by an object detection process, providing an alarm for each object detected, selecting in the second channel objects satisfying at least a predetermined energy criterion, applying a second matched filtering on the signal of the second channel around the selected objects, estimating in the second channel the Doppler of the selected objects, estimating inherent Doppler, classifying the selected objects by discrimination between bottom echoes and true echoes on the basis of the values of the Doppler of the selected objects estimated in the second channel and of the inherent Doppler, and eliminating in the first channel the alarms detected corresponding to bottom echoes.

10. A method of processing signals received corresponding to a signal emitted comprising by recurrence two pulses, a first Doppler tolerant broadband pulse and a second Doppler intolerant broadband pulse, said method comprising:

forming a first channel comprising the part of the signal received corresponding to the Doppler tolerant pulses, and a second channel comprising part of the signal received corresponding to the Doppler intolerant pulses;

applying a first matched filtering to the signal on the first channel followed by an object detection process;

providing an alarm for each object detected;

selecting in the second channel objects based upon the provided alarms that satisfy at least a predetermined energy criterion;

applying a second matched filtering on the signal of the second channel around the selected objects;

estimating in the second channel a Doppler of the selected objects;

estimating inherent Doppler;

classifying the selected objects by discrimination between bottom echoes and true echoes on the basis of values of the Doppler of the selected objects estimated in the second channel and of the inherent Doppler; and eliminating in the first channel the alarms detected corresponding to bottom echoes;

wherein the emitted signal come from a pulse of HFM type, and from a pulse of BPSK type, the two pulses being emitted in the same recurrence.

11. An active sonar comprising, means of emitting a signal comprising by recurrence two pulses, a Doppler tolerant broadband pulse and a Doppler intolerant broadband pulse, and means of receiving the signal emitted implementing the method of processing signals as claimed in claim 10.

12. The active sonar as claimed in claim 11, wherein the means of emission emit the two pulses at different instants with totally or partly overlapping frequency bands.

13. The active sonar as claimed in claim 11, wherein the means of emission emit the two pulses simultaneously with distinct frequency bands.

* * * * *